United States Patent
Ikeda et al.

(10) Patent No.: US 12,255,328 B2
(45) Date of Patent: Mar. 18, 2025

(54) NEGATIVE ELECTRODE MATERIAL FOR LITHIUM ION BATTERY

(71) Applicant: MAZDA MOTOR CORPORATION, Hiroshima (JP)

(72) Inventors: Suguru Ikeda, Hiroshima (JP); Hiroki Fujita, Hiroshima (JP); Hackho Kim, Fukuoka (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 513 days.

(21) Appl. No.: 17/583,389

(22) Filed: Jan. 25, 2022

(65) Prior Publication Data

US 2022/0285677 A1 Sep. 8, 2022

(30) Foreign Application Priority Data

Mar. 5, 2021 (JP) ................................. 2021-035146

(51) Int. Cl.
*H01M 4/525* (2010.01)
*H01M 4/02* (2006.01)
*H01M 4/36* (2006.01)

(52) U.S. Cl.
CPC .......... *H01M 4/525* (2013.01); *H01M 4/364* (2013.01); *H01M 2004/021* (2013.01); *H01M 2004/027* (2013.01)

(58) Field of Classification Search
None
See application file for complete search history.

(56) References Cited

U.S. PATENT DOCUMENTS

| 3,410,728 A | * | 11/1968 | Fullman | ............... H01M 4/9025 |
| | | | | 429/479 |
| 2003/0027033 A1 | * | 2/2003 | Seabaugh | ............... C04B 35/50 |
| | | | | 264/618 |
| 2013/0224591 A1 | | 8/2013 | Kishimi et al. | |
| 2015/0311518 A1 | * | 10/2015 | Kawanaka | ............. C01G 49/06 |
| | | | | 423/633 |
| 2021/0265626 A1 | * | 8/2021 | Youm | .................... H01M 4/386 |

FOREIGN PATENT DOCUMENTS

| CN | 103380517 A | * 10/2013 | ............... H01B 1/02 |
| JP | 2017-174649 A | 9/2017 | |
| WO | 2013/125021 A1 | 8/2013 | |

OTHER PUBLICATIONS

Zhu, Shali; Crystallite Size Control and Resulting Electrochemistry of Magnetite, Fe3O4, 2009, Electrochemical and Solid-State Letters, 12, A91, A93 (Year: 2009).*
CN 103380517 A Machine translation.*
Huie, M. et al; Isothermal Microcalorimetry: Insight into the impact of crystallite size and agglomeration on the lithiation of magnetite ; 2019; ACS appl. mater. interfaces; 11, 7; p. 7074-7086.*

* cited by examiner

*Primary Examiner* — Brian R Ohara
*Assistant Examiner* — Quintin D. Elliott
(74) *Attorney, Agent, or Firm* — Studebaker Brackett PLLC (57) ABSTRACT

To improve the cycle characteristics of a lithium ion battery, a mixture of a powder of a conversion-type oxide made of an iron oxide and/or a silicon oxide and causing a conversion reaction with Li ions and a powder of an oxygen ion conductor are used as a negative electrode material of the lithium ion battery.

7 Claims, 6 Drawing Sheets

NEGATIVE ELECTRODE MATERIAL FOR LITHIUM ION BATTERY

CROSS-REFERENCE TO RELATED APPLICATION

This application claims priority to Japanese Patent Application No. 2021-035146 filed on Mar. 5, 2021, the entire disclosure of which is incorporated by reference herein.

BACKGROUND

The capacity of a lithium ion battery depends on the amount of lithium ions that can be absorbed in the electrode material of the lithium ion battery. An iron oxide has been known as a negative electrode material for the lithium ion battery, as disclosed, for example, in Japanese Unexamined Patent Publication No. 2017-174649. The iron oxide absorbs and releases Li ions through conversion reactions, unlike graphite which has been the mainstream of the negative electrode material. Magnetite, for example, can absorb five times as many Li ions as graphite.

However, conversion-type oxides, such as magnetite, undergo a great degree of volume expansion and contraction in absorbing and releasing the Li ions. Thus, repeated charge and discharge incur rapid degradation of the conversion-type oxide, which leads to a reduction in charge capacity.

SUMMARY

The present disclosure improves the cycle characteristics of a lithium ion battery using a conversion-type negative electrode material. According to the present disclosure, an oxygen ion conductor powder is added to a conversion-type oxide powder serving as a negative electrode material of a lithium ion battery.

Specifically, a negative electrode material for a lithium ion battery disclosed herein is characterized in that the negative electrode material contains a mixture of a powder of a conversion-type oxide and a powder of an oxygen ion conductor, the conversion-type oxide being made of an iron oxide and/or a silicon oxide and causing a conversion reaction with Li ions.

According to this configuration, the oxygen ion conductor serves as a buffer material against the volume expansion and contraction of the conversion-type oxide and hence reduces the degradation of the conversion-type oxide. Thus, the cycle characteristics of the battery improve. In addition, the oxygen ion conductor functions as a catalyst for the absorption and release reaction of Li ions in the conversion-type oxide, thereby improving the rate characteristics of the battery. That is, since the conversion-type oxide absorbs Li ions as a result of lithium being combined with the oxygen of the conversion-type oxide, the absorption and release of the Li ions are accompanied by transfer of oxygen ions. The oxygen ion conductor promotes the transfer of the oxygen ions. The reaction resistance of the Li ions is therefore lowered, which improves the rate characteristics.

As the iron oxide serving as the conversion-type oxide, α-hematite, γ-maghemite, or magnetite is suitable, and magnetite is particularly suitable. An iron oxide with different phases, such as magnetite and α-hematite phases, may be used. In one preferred embodiment, such an iron oxide has an average particle size D50, with reference to volume, of about 10 nm or more and about 1000 nm or less to enhance the conversion reaction.

As a silicon oxide serving as the conversion-type oxide, a silicon oxide having an Si phase and an $SiO_2$ phase is suitable. For example, a silicon oxide expressed by $SiOn$ ($0.3<n<1.6$) is suitable. In one preferred embodiment, the silicon oxide has an average particle size D50, with reference to volume, of 3 μm or more and 10 μm or less to enhance the conversion reaction.

In one preferred embodiment, the oxygen ion conductor is made of samarium-doped ceria (SDC) and/or yttria-stabilized zirconia (YSZ). SDC is particularly preferable. In one preferred embodiment, the oxygen ion conductor has an average particle size D50, with reference to volume, of about 1 nm or more and about 100 nm or less to improve the buffering properties against the volume expansion and contraction and enhance the conversion reaction.

Further, in one preferred embodiment, the proportion of the oxygen ion conductor powder in the total amount of the conversion-type oxide powder and the oxygen ion conductor powder is 3 mass % or more and 30 mass % or less. If this proportion is less than 3 mass %, sufficient effects cannot be obtained in the aforementioned improvement of the buffering properties against the volume expansion and contraction or the enhancement in the conversion reaction. The oxygen ion conductor powder itself does not absorb Li ions; therefore, the greater the proportion of the oxygen ion conductor powder is, the more adversely the oxygen ion conductor powder affects the output of the battery. Thus, the proportion is preferably 30 mass % or less.

DESCRIPTION OF EMBODIMENT

An embodiment of the present disclosure will be described with reference to the drawings. The following description of a preferred embodiment is merely illustrative in nature and is not intended to limit the present disclosure and applications or uses thereof.

<Lithium Ion Battery (Secondary Battery)>

[Negative Electrode]

A lithium ion battery according to the present embodiment has a negative electrode including a negative electrode material made of a mixture of a conversion-type oxide powder and an oxygen ion conductor powder. The conversion-type oxide powder is made of an iron oxide and/or a silicon oxide and causes a conversion reaction with Li ions. The negative electrode material serves as a negative electrode active material. The negative electrode material is mixed with a conductive assistant and a binder, and the thus-obtained mixture is applied to a surface of a collector.

Preferred examples of the collector include a copper foil. As the binder, styrene-butadiene rubber (SBR), a combination (SBR-CMC) of styrene-butadiene rubber (SBR) and carboxymethylcellulose as a thickener, PVdF, an imide-based binder, or a polyacrylic acid-based binder may be preferably employed.

[Positive Electrode]

The lithium ion battery has a positive electrode formed by mixing a positive electrode active material, a conductive assistant, and a binder and applying the mixture to a collector. Preferred examples of the collector include an aluminum foil.

Preferred examples of the positive electrode active material include: a composite metal oxide of lithium and one or more kinds selected from the group consisting of cobalt, manganese, and nickel; a phosphoric acid-based lithium compound; and a silicic acid-based lithium compound. In particular, a phosphoric acid-based lithium is suitably employed. One kind of these positive electrode active materials may be used alone or two or more kinds of them may be used in combination.

As the binder, polyvinylidene fluoride (PVdF) can be suitably employed. As the conductive assistant, any of carbon black, acetylene black, carbon nanofibers (CNFs), and the like can be employed.

[Nonaqueous Electrolyte]

A nonaqueous electrolyte is obtained by dissolving a lithium salt (support electrolyte) in a nonaqueous solvent. Additives are added to the nonaqueous electrolyte as needed. Kinds of the nonaqueous solvent are not particularly limited, and examples thereof include: a cyclic carbonate ester such as ethylene carbonate (EC), propylene carbonate (PC), and butylene carbonate (BC); a chain carbonate ester such as diethyl carbonate (DEC), ethyl methyl carbonate (EMC), and dimethyl carbonate (DMC); a cyclic carboxylate ester such as γ-butyrolactone (GBL) and γ-valerolactone (GVL); and the like. As the nonaqueous solvent, one kind of these substances may be used alone, or two or more kinds of them may be used in combination.

Preferred examples of the lithium salt include $LiPF_6$, $LiPO_2F_2$, $LiBF_4$, $LiN(SO_2F)_2$, $LiN(SO_2CF_3)_2$, $LiN(SO_2C_2F_5)_2$, and the like. One kind of these lithium salts may be used alone, or two or more kinds of them may be used in combination.

Examples of the additive include a wettability improving solvent that improves the wettability of the electrolyte with respect to the separator, and a solid electrolyte interphase (SEI) forming solvent. Examples of the wettability improving solvent include dibutyl carbonate (DBC), methylbutyl carbonate (MBC), ethylbutyl carbonate (EBC), and the like. In one preferred embodiment, the amount of the wettability improving solvent added is about 3 mass % or more and about 10 mass % or less of the nonaqueous solvent. Examples of the SEI forming solvent include vinylene carbonate (VC), methylvinylene carbonate (MVC), ethylvinylene carbonate (EVC), fluorovinylene carbonate (FVC), vinylethylene carbonate (VEC), ethynylethylene carbonate (EEC), ethylene sulfite (ES), fluoroethylene carbonate (FEC), and the like. One kind of these SEI forming solvents may be used alone, or two or more kinds of them may be used in combination. In one preferred embodiment, the amount of the SEI forming solvent added is about 0.5 mass % or more and about 5 mass % or less of the nonaqueous solvent.

[Separator]

The separator is not particularly limited, and a single-layer or laminated microporous film, woven fabric, nonwoven fabric, or the like, which are made of polyolefin, such as polypropylene and polyethylene, can be employed.

EXAMPLES AND COMPARATIVE EXAMPLES OF NEGATIVE ELECTRODE MATERIAL

Example 1

A magnetite $Fe_3O_4$ powder (D50=500 nm) as the conversion-type oxide and an SDC ($Sm_{0.2}Ce_{0.8}O_{2-\delta}$) powder (D50=50 nm) as an oxygen ion conductor were mixed by a solid-phase method, thereby obtaining a negative electrode material having an SDC concentration of 5 mass % (hereinafter referred to as "5% SDC").

Example 2

A negative electrode material having an SDC concentration of 10 mass % (hereinafter referred to as "10% SDC") was obtained by the same method as that of Example 1.

Example 3

A negative electrode material having an SDC concentration of 20 mass % (hereinafter referred to as "20% SDC") was obtained by the same method as that of Example 1.

Example 4

A negative electrode material having an SDC concentration of 30 mass % (hereinafter referred to as "30% SDC") was obtained by the same method as that of Example 1.

Example 5

A negative electrode material having a YSZ concentration of 20 mass % (hereinafter referred to as "20% YSZ") was obtained by the same method as that of Example 1, using YSZ ($Y_2O_3$=3 mol %) powder (D50=50 nm) as the oxygen ion conductor.

Comparative Example 1

A negative electrode material made of magnetite $Fe_3O_4$ powder alone was prepared without adding an oxygen ion conductor.

[Evaluation of Cycle Characteristics]

Cycle characteristics were evaluated using a coin cell 2032. The negative electrode mixture contained 80 wt % of the negative electrode material, 5 wt % of the conductive assistant, and 15 wt % of the imide-based binder. These three substances were mixed together to prepare a mixture slurry. The mixture slurry was applied to a copper foil as a collector and was dried at 80° C. The mixture was then dried at 180° C. in a vacuum oven to imidize the binder. The obtained negative electrode was placed in a glove box, in which the negative electrode and a positive electrode (counter electrode) made of a Li metal were opposed to each other with a porous separator interposed therebetween and were sealed in a coin cell container together with an electrolyte to obtain a half-cell. The electrolyte was prepared by adding $LiPF_6$ (1M) to a nonaqueous solvent obtained by mixing EC and DEC at a capacity ratio of 3:7.

(Cycle Characteristics)

Figure 1:
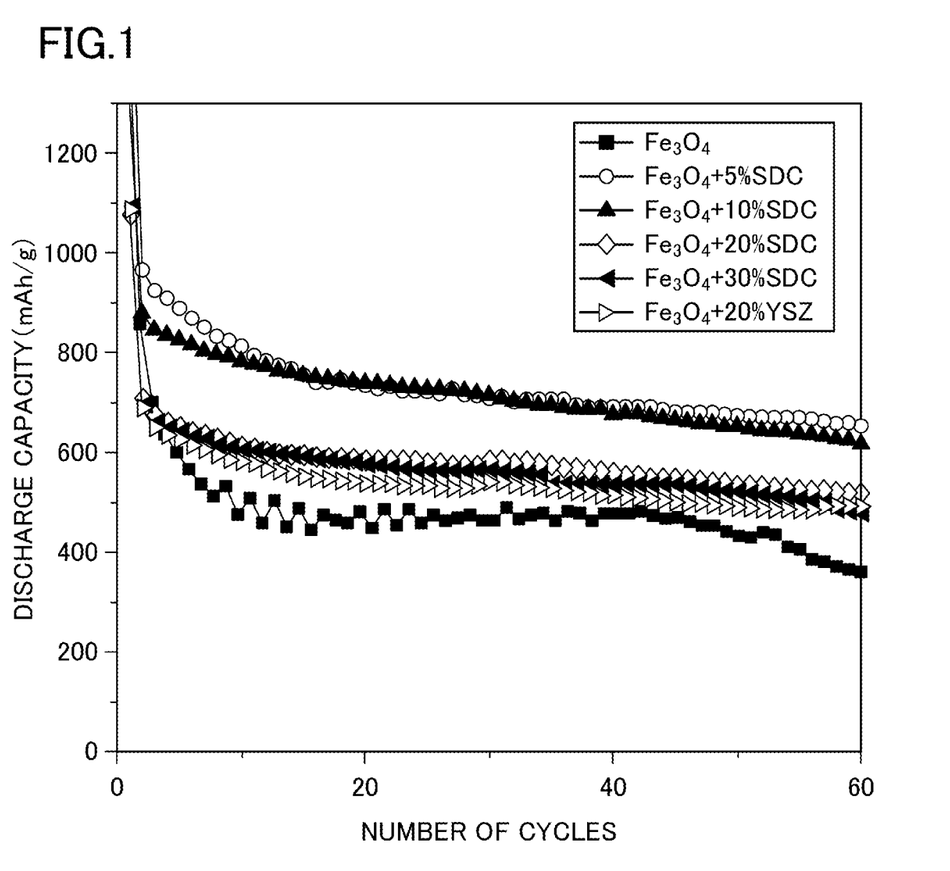
FIG. 1 is a graph showing results of cycle tests of Examples 1 to 5 and Comparative Example 1.

The half-cells were created using the respective negative electrode materials of Examples 1 to 5 and Comparative Example 1, and charge and discharge cycle tests were performed in a potential range of 0.01 V to 3.0 V at a current density of 200 mA/g. The test temperature was 20° C. FIG. 1 shows changes in the discharge capacity.

The discharge capacity of Comparative Example 1 (without an oxygen ion conductor) greatly decreases from around the third cycle, and further decreases from around the 45th cycle. On the other hand, decreases in the discharge capacity of Examples 1 to 5, to each of which an oxygen ion conductor is added, are small.

Example 1 with 5% SDC has the highest rate of retention of the discharge capacity at the 60th cycle. The rate of retention of the discharge capacity decreases as the proportion of the SDC increases. However, the rate of retention of the discharge capacity of Example 4 with 30% SDC is higher than that of Comparative Example 1 ($Fe_3O_4$) not containing an oxygen ion conductor. The rate of retention of the discharge capacity of Example 5, too, which contains YSZ as the oxygen ion conductor ($Fe_3O_4$+10% YSZ), is higher than that of Comparative Example 1.

Figure 2:
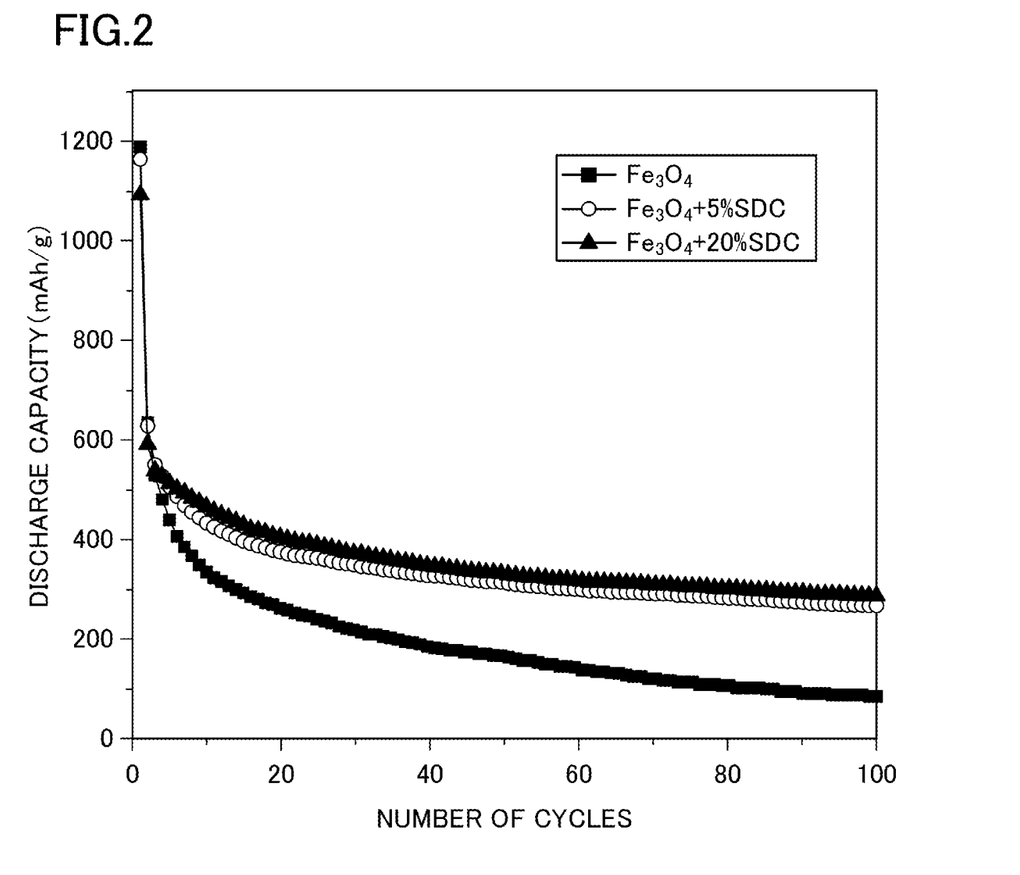
FIG. 2 is a graph showing results of low temperature cycle tests of Examples 1 and 3 and Comparative Example 1.

Now, results of charge and discharge cycle tests performed at a temperature of −10° C. on Example 1 (5% SDC), Example 3 (20% SDC), and Comparative Example 1 (without an oxygen ion conductor) are shown in FIG. 2. The rate of retention of the discharge capacity is higher than that of Comparative Example 1 even at the low temperature of −10° C. in the cases where SDC is added.

This means that the addition of the oxygen ion conductor (SDC or YSZ) to the conversion-type oxide ($Fe_3O_4$) can improve the cycle characteristics not only at ordinary temperatures, but also at low temperatures.

(Rate Characteristics)

Figure 3:
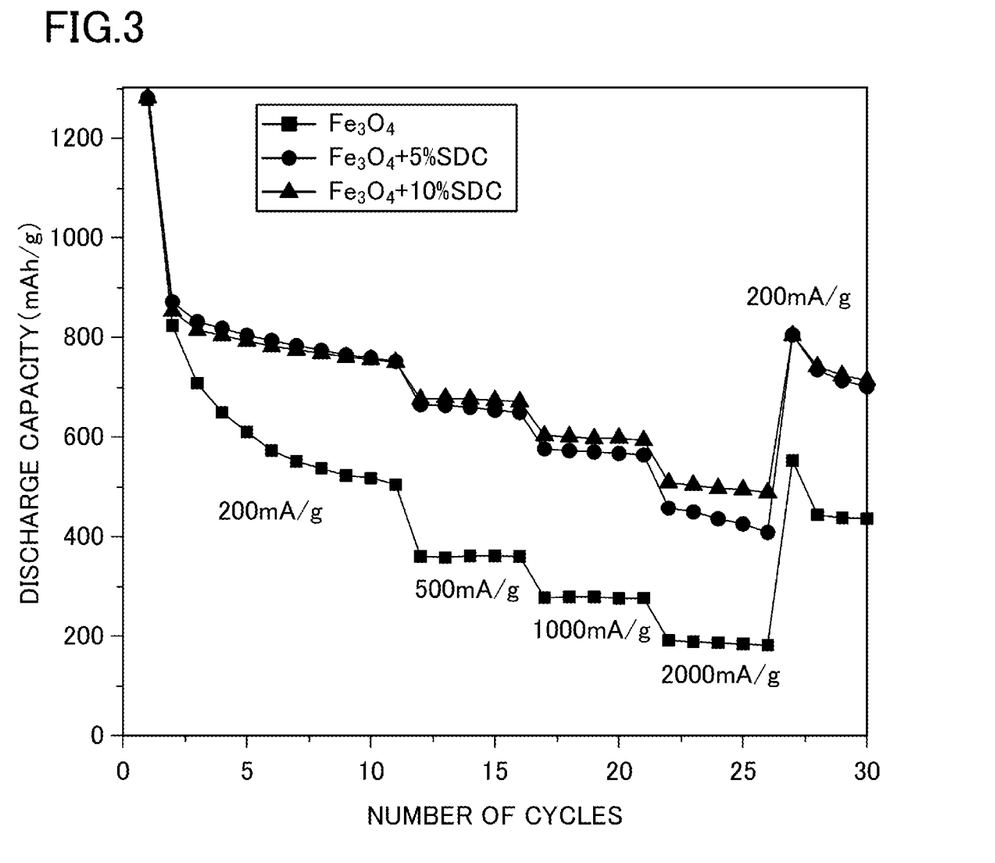
FIG. 3 is a graph showing results of evaluation of rate characteristics in cycle tests of Examples 1 and 2 and Comparative Example 1.

Charge and discharge cycle tests were performed on Example 1 (5% SDC), Example 2 (10% SDC), and Comparative Example 1 (without oxygen ion conductor). In the tests, the current density was changed from 200 mA/g to 500 mA/g, 1000 mA/g, and 2000 mA/g sequentially every five cycles and back to 200 mA/g. The results are shown in FIG. 3.

The rate of reduction in the discharge capacity at the time when the current density reached 2000 mA/g from 200 mA/g is about 60% in Comparative Example 1 (without an oxygen ion conductor). On the other hand, the rate of reduction of Example 1 (5% SDC) and that of Example 2 (10% SDC) are each about 30% to 40%. The rate of reduction of Example 2 (10% SDC) is smaller than that of Example 1 (5% SDC).

The test results on the cycle characteristics and the rate characteristics (the tendency of change in the cycle characteristics and the rate characteristics with respect to change in the proportion of SDC added) show that the addition of SDC even in the proportion of about 3% provides an effect on the battery improvement. The test results also show that SDC added in the proportion of 5% or more and 10% or less in particular provides an effect on the battery improvement.

(Impedance Measurement)

AC impedance of Example 5 (30% SDC) and that of Comparative Example 1 (without oxygen ion conductor) in a charge state (3 V) were measured, using an impedance measurement device, under the conditions of measurement frequency range of 0.01 Hz to 100000 Hz at different temperatures. The measurement temperature was 10° C., 20° C., 30° C., and 40° C.

Figure 4:
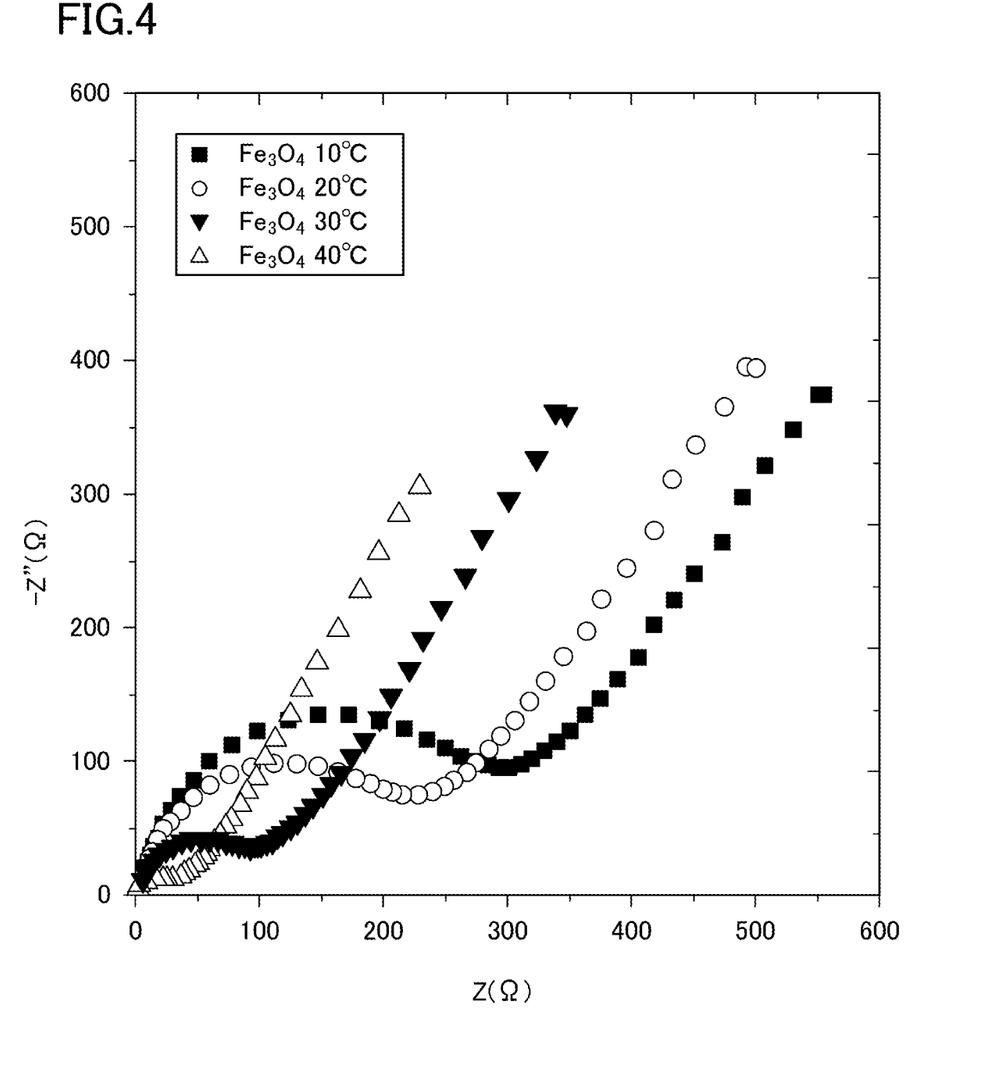
FIG. 4 is a graph showing results of measurement of alternating current (AC) impedance at respective temperatures in Comparative Example 1.
Figure 5:
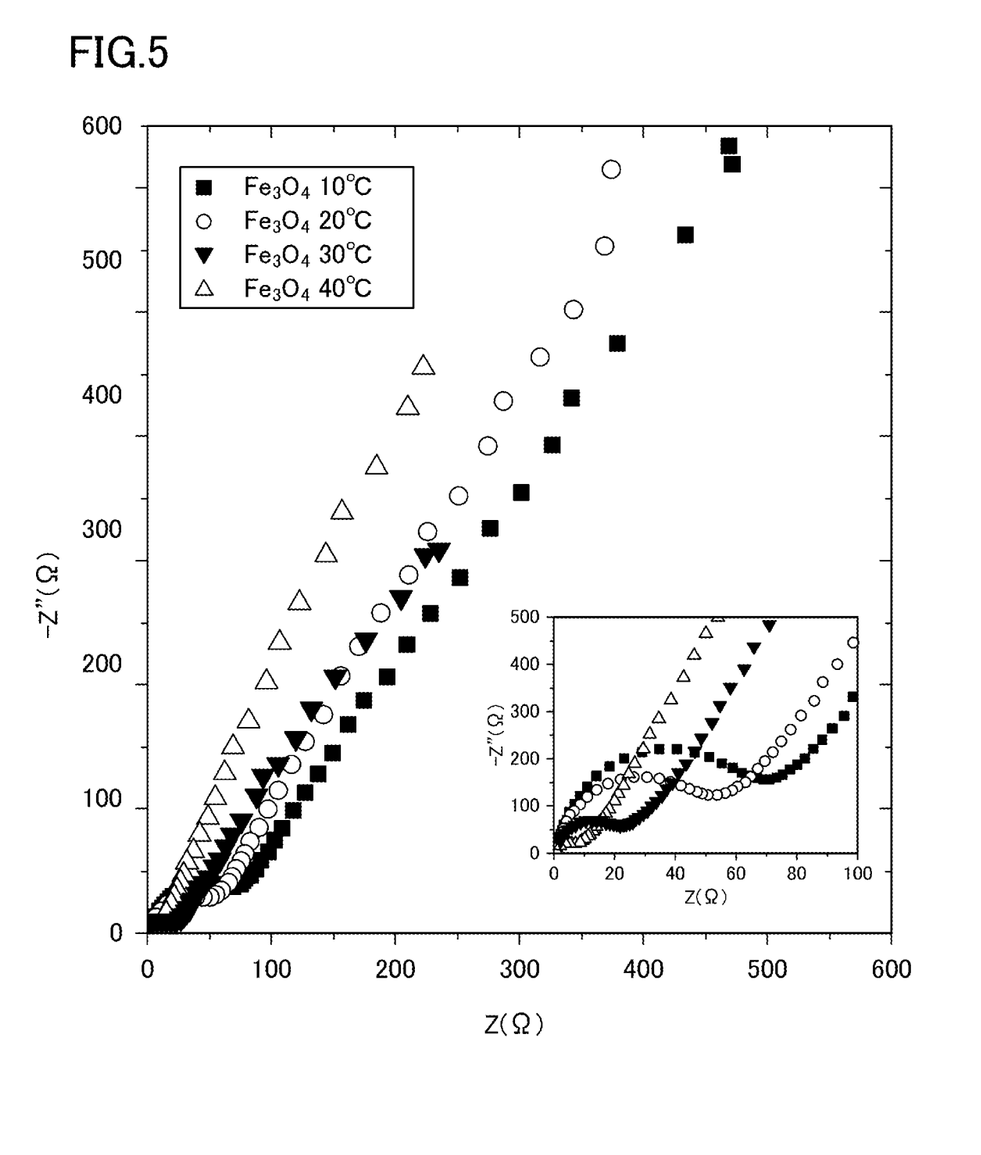
FIG. 5 is a graph showing results of measurement of AC impedance at respective temperatures in Example 5.

FIG. 4 shows a Cole-Cole plot (complex impedance diagram) of Comparative Example 1, and FIG. 5 shows a Cole-Cole plot of Example 5.

In the diagrams of both of Comparative Example 1 (FIG. 4) and Example 5 (FIG. 5), the lower the temperature is, the bigger the arcs drawn by the Cole-Cole plot become. However, in Example 5 (FIG. 5), the arcs are smaller than those of Comparative Example 1 (FIG. 4) and the degree of increase in size of the arcs associated with the reduction in temperature is also smaller than that of Comparative Example 1. This may be because the oxygen ion conductor (SDC) functions as a catalyst for the absorption and release reaction of Li ions in the conversion-type oxide ($Fe_3O_4$), thereby lowering the reaction resistance of the Li ions.

<Case where Conversion-Type Oxide is Silicon Oxide>

Example 6

A silicon oxide SiO having an Si phase and an $SiO_2$ phase was employed as the conversion-type oxide. A powder of the SiO (D50=5 μm) and an SDC ($Sm_{0.2}Ce_{0.8}O_{2-\delta}$) powder (D50=50 nm) were mixed by a solid-phase method, thereby obtaining a negative electrode material having an SDC concentration of 5 mass % (SiO+5% SDC).

Comparative Example 2

A negative electrode material (SiO) made of the SiO powder alone was prepared without adding an oxygen ion conductor.

[Evaluation of Cycle Characteristics]

Figure 6:
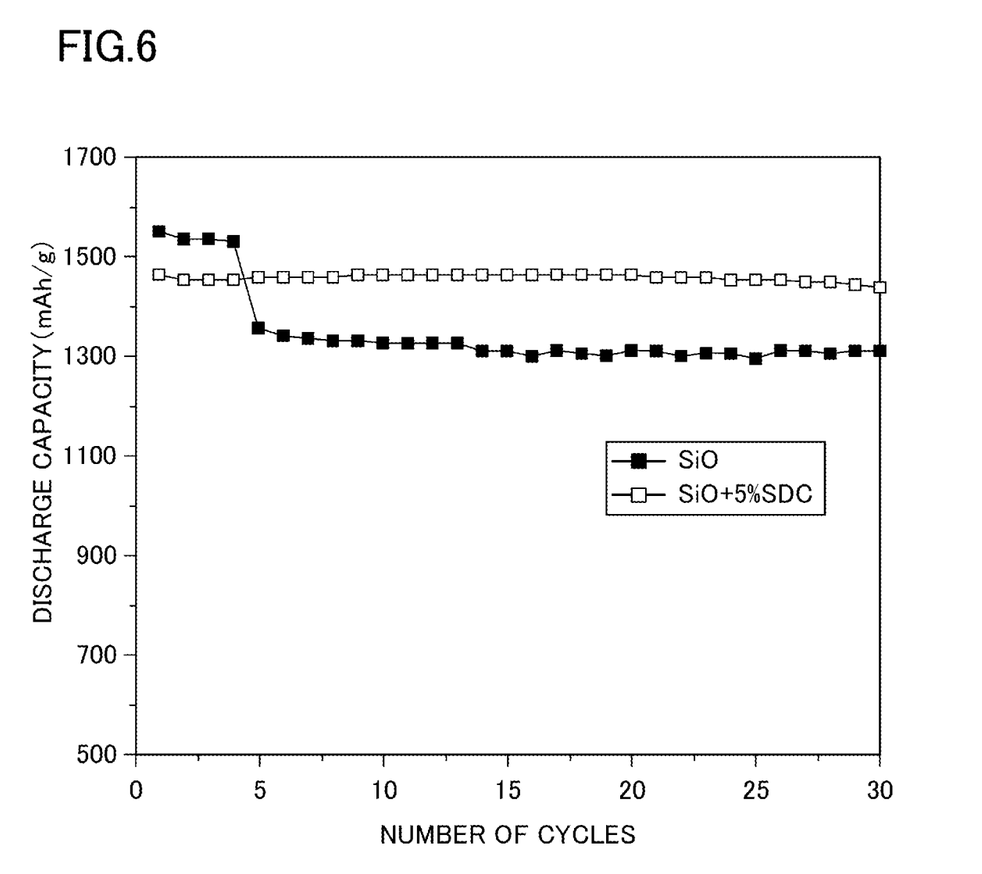
FIG. 6 is a graph showing results of cycle tests of Example 6 and Comparative Example 2.

To evaluate the cycle characteristics, the half-cells were created using the same materials and under the same manufacturing conditions as those of Examples 1 to 5 and Comparative Example 1, and charge and discharge cycle tests were performed in a potential range of 0.01 V to 3.0 V at a current density of 200 mA/g and a temperature of 20° C. FIG. 6 shows changes in the discharge capacity.

In Example 6 (SiO+5% SDC), unlike Comparative Example 2 (SiO), there is almost no decrease in the discharge capacity with an increase in the number of cycles. This means that in the case of SiO, too, the addition of the oxygen ion conductor SDC thereto provides an effect on improvement in the cycle characteristics.

What is claimed is:

1. A negative electrode material for a lithium ion secondary battery, the negative electrode material comprising
   a mixture of a powder of a conversion-type oxide and a powder of an oxygen ion conductor, the conversion-type oxide being made of an iron oxide and/or a silicon oxide and absorbing and releasing Li ions through conversion reactions, wherein
   the conversion-type oxide is made of magnetite and/or a silicon oxide SiO having an Si phase and an $SiO_2$ phase,
   the oxygen ion conductor is made of samarium-doped ceria,
   a proportion of the powder of the oxygen ion conductor in a total amount of the powder of the conversion-type oxide and the powder of the oxygen ion conductor is 3 mass % or more and 10 mass % or less, and
   a rate of retention of a discharge capacity at a 30th cycle of the lithium ion secondary battery containing the negative electrode material comprising the mixture is higher than a rate of retention of a discharge capacity at a 30th cycle of a lithium ion secondary battery containing a negative electrode material including the powder of the conversion-type oxide without the powder of the oxygen ion conductor.

2. The negative electrode material of claim 1, wherein the conversion-type oxide is made of magnetite.

3. The negative electrode material of claim 1, wherein the oxygen ion conductor has an average particle size D50, with reference to volume, of 1 nm or more and 100 nm or less.

4. The negative electrode material of claim 2, wherein the oxygen ion conductor has an average particle size D50, with reference to volume, of 1 nm or more and 100 nm or less.

5. The negative electrode material of claim 3, wherein the conversion-type oxide is magnetite particles having an average particle size D50, with reference to volume, of 10 nm or more and 1000 nm or less.

6. The negative electrode material of claim 4, wherein the conversion-type oxide is magnetite particles having an average particle size D50, with reference to volume, of 10 nm or more and 1000 nm or less.

7. The negative electrode material of claim 1, wherein the oxygen ion conductor functions as a catalyst for absorption and release reaction of Li ions in the conversion-type oxide.

* * * * *